(12) United States Patent
He

(10) Patent No.: US 12,354,505 B2
(45) Date of Patent: Jul. 8, 2025

(54) PROFILING DEVICE, MANUFACTURING METHOD OF DISPLAY PANEL, AND DISPLAY PANEL

(71) Applicant: Wuhan China Star Optoelectronics Semiconductor Display Technology Co., Ltd., Wuhan (CN)

(72) Inventor: Ping He, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/621,835

(22) PCT Filed: Dec. 14, 2021

(86) PCT No.: PCT/CN2021/137835
§ 371 (c)(1),
(2) Date: Dec. 22, 2021

(87) PCT Pub. No.: WO2023/102963
PCT Pub. Date: Jun. 15, 2023

(65) Prior Publication Data
US 2024/0312374 A1  Sep. 19, 2024

(30) Foreign Application Priority Data
Dec. 6, 2021  (CN) .......................... 202111475757.2

(51) Int. Cl.
*G09F 9/30* (2006.01)
*B28B 3/08* (2006.01)
(Continued)

(52) U.S. Cl.
CPC .............. *G09F 9/301* (2013.01); *B28B 3/083* (2013.01); *B28B 7/025* (2013.01); *B29C 2043/3626* (2013.01)

(58) Field of Classification Search
CPC .. B28B 7/02; B28B 7/025; B28B 3/08; B28B 3/083; B29C 2043/3626
(Continued)

(56) References Cited

U.S. PATENT DOCUMENTS 881,912  A  *  3/1908  Emrick ................. B29C 33/302
                                          249/141
2,372,418  A  *  3/1945  Forbes ................. C03B 23/031
                                          425/DIG. 30
(Continued)

FOREIGN PATENT DOCUMENTS

CN  106094269 A  11/2016
CN  111899637 A  11/2020
(Continued)

*Primary Examiner* — Emmanuel S Luk
(74) *Attorney, Agent, or Firm* — Nathan & Associates Patent Agents Ltd.; Menachem Nathan

(57) ABSTRACT

A profiling device, a manufacturing method of a display panel, and the display panel are disclosed. Wherein, the profiling component includes a first surface, and the first surface includes a first region and a second region. When the profiling component is in a first state, the first surface is used to attach to a display component. When the profiling component is in a second state, a part of the first surface corresponding to the first region is arc-shaped and higher than a part of the first surface corresponding to the second region to allow a position of the display component corresponding to the second region to form a curved structure.

16 Claims, 8 Drawing Sheets

(51) Int. Cl.
*B28B 7/02* (2006.01)
*B29C 43/36* (2006.01)

(58) Field of Classification Search
USPC .................... 33/561.3, 561.1; 425/2
See application file for complete search history.

(56) References Cited

U.S. PATENT DOCUMENTS

| | | | | |
|---|---|---|---|---|
| 2,410,888 A * | 11/1946 | Lucy | B28B 7/02 33/561.1 |
| 2,442,022 A * | 5/1948 | Schulz | B41C 3/00 264/293 |
| 2,704,893 A * | 3/1955 | Shane | B43L 11/00 33/561.3 |
| 2,968,838 A * | 1/1961 | Hicks | B28B 7/025 249/117 |
| 2,969,544 A * | 1/1961 | Di Marco | H01Q 15/144 343/912 |
| 3,172,453 A * | 3/1965 | Lauper | B21D 25/02 72/212 |
| 3,596,869 A * | 8/1971 | Humphrey | B29C 44/585 264/553 |
| 3,854,859 A * | 12/1974 | Sola | B29C 48/08 425/381 |
| 4,200,272 A * | 4/1980 | Godding | B25B 1/2421 269/26 |
| 4,342,549 A * | 8/1982 | Lemelson | B29C 33/0033 425/185 |
| 4,731,144 A * | 3/1988 | Kommineni | B21D 47/00 343/912 |
| 4,890,235 A * | 12/1989 | Reger | A61G 5/1043 264/222 |
| 4,936,560 A * | 6/1990 | Barozzi | B23Q 1/035 33/561.1 |
| 4,972,351 A * | 11/1990 | Reger | A61F 5/01 264/222 |
| 5,151,277 A * | 9/1992 | Bernardon | B29C 70/443 249/161 |
| 5,168,635 A * | 12/1992 | Hoffman | B28B 7/025 33/561.1 |
| 5,192,560 A * | 3/1993 | Umetsu | B29C 33/302 249/161 |
| 5,281,117 A * | 1/1994 | Hong | B44C 3/042 249/82 |
| 5,330,343 A * | 7/1994 | Berteau | B28B 7/025 249/161 |
| 5,387,384 A * | 2/1995 | Irving | B29C 39/026 264/223 |
| 5,470,590 A * | 11/1995 | Brubaker | A47C 23/002 264/222 |
| 5,513,972 A * | 5/1996 | Schroeder | B29C 33/302 249/161 |
| 5,546,784 A * | 8/1996 | Haas | B21J 13/02 72/413 |
| 5,702,733 A * | 12/1997 | Enami | B21D 37/02 425/DIG. 30 |
| 5,743,164 A * | 4/1998 | Guez | B26F 1/04 83/563 |
| 5,796,620 A * | 8/1998 | Laskowski | G05B 19/4207 700/118 |
| 5,846,464 A * | 12/1998 | Hoffman | B29C 33/308 425/DIG. 30 |
| 5,851,563 A * | 12/1998 | Hoffman | B28B 7/025 425/182 |
| 5,954,175 A * | 9/1999 | Haas | B21D 37/02 74/665 F |
| 6,053,026 A * | 4/2000 | Nardiello | B21D 37/02 72/413 |
| 6,089,061 A * | 7/2000 | Haas | B21D 37/16 72/413 |
| 6,125,338 A * | 9/2000 | Brienza | G01B 11/24 702/167 |
| 6,298,896 B1 * | 10/2001 | Sherrill | B29C 33/308 249/161 |
| 6,354,561 B1 * | 3/2002 | Fahrion | B28B 7/02 425/150 |
| 6,484,776 B1 * | 11/2002 | Meilunas | B32B 37/00 156/581 |
| 6,610,230 B2 * | 8/2003 | Jiang | B29C 33/3857 264/161 |
| 6,700,563 B1 * | 3/2004 | Koizumi | G01B 5/207 700/118 |
| 6,907,672 B2 * | 6/2005 | Said | G01B 5/0002 702/167 |
| 6,923,635 B2 * | 8/2005 | Burgess | B29C 45/376 425/186 |
| 7,159,836 B2 * | 1/2007 | Parks | B29C 43/36 249/155 |
| 7,398,586 B2 * | 7/2008 | Prichard | B64C 3/26 29/448 |
| 7,503,758 B2 * | 3/2009 | Reis | B29C 73/06 425/468 |
| 7,731,207 B2 * | 6/2010 | Santos | B64F 5/50 414/339 |
| 7,810,940 B2 * | 10/2010 | Schramek | F24S 23/70 359/881 |
| 7,980,921 B2 * | 7/2011 | Saravanos | B28D 1/225 33/527 |
| 7,997,891 B2 * | 8/2011 | Gallagher | B29C 33/302 264/553 |
| 8,206,637 B2 * | 6/2012 | Dietrich | B22F 12/13 264/482 |
| 8,966,763 B1 * | 3/2015 | Heck | B25B 11/00 219/656 |
| 9,113,553 B2 * | 8/2015 | An | H05K 5/0017 |
| 9,202,395 B2 * | 12/2015 | Cho | G09F 9/301 |
| 9,664,265 B2 * | 5/2017 | Peters | F16H 25/12 |
| 10,060,001 B2 * | 8/2018 | Heck | C21D 9/0068 |
| 10,078,174 B2 * | 9/2018 | You | G02B 6/0038 |
| 10,471,667 B2 * | 11/2019 | Siagam | B29B 11/16 |
| 10,473,826 B2 * | 11/2019 | Du | G02B 3/08 |
| 10,603,835 B2 * | 3/2020 | Hall | B29C 33/302 |
| 10,926,448 B2 * | 2/2021 | Ono | B29C 70/541 |
| 11,001,016 B2 * | 5/2021 | Vlavianos | B29C 33/02 |
| 11,577,431 B2 * | 2/2023 | Almousa | B29C 33/3857 |
| 12,157,273 B2 * | 12/2024 | Biegelsen | B29C 64/379 |
| 12,162,197 B2 * | 12/2024 | Legum | B33Y 30/00 |
| 2004/0159974 A1 * | 8/2004 | Fischer | B29C 33/308 425/111 |
| 2004/0262816 A1 * | 12/2004 | Parks | B29C 43/36 264/324 |
| 2008/0302500 A1 * | 12/2008 | Winkler | B29C 33/308 164/45 |
| 2009/0032677 A1 * | 2/2009 | Hijlkema | B29C 33/302 249/13 |
| 2009/0108491 A1 * | 4/2009 | Frayne | B29C 33/302 264/226 |
| 2011/0300254 A1 * | 12/2011 | Wang | B21D 37/02 425/450.1 |
| 2012/0279812 A1 * | 11/2012 | Peters | G05B 19/4099 700/275 |
| 2012/0293411 A1 * | 11/2012 | Leithinger | G06F 3/017 345/158 |
| 2013/0299084 A1 * | 11/2013 | Kristensen | B29C 33/307 156/290 |
| 2014/0170870 A1 * | 6/2014 | Martineau | G06F 3/016 439/131 |
| 2014/0175704 A1 * | 6/2014 | Eberdt | B29C 43/52 264/319 |
| 2015/0248960 A1 * | 9/2015 | Khan | H01F 7/064 361/143 |
| 2015/0352775 A1 * | 12/2015 | Geshlider | B29C 51/30 264/222 |
| 2016/0165726 A1 | 6/2016 | Lee et al. | |

(56) References Cited

U.S. PATENT DOCUMENTS

2017/0259455 A1* 9/2017 Kim .......................... B28B 7/06
2018/0222107 A1* 8/2018 Hall ........................ B29C 51/30
2020/0057594 A1   2/2020 Nakano

FOREIGN PATENT DOCUMENTS

| CN | 112382202 A | 2/2021 |
| CN | 112912350 A | 6/2021 |
| CN | 113035084 A | 6/2021 |
| CN | 113053245 A | 6/2021 |
| JP | H07299527 A | 11/1995 |
| KR | 20170119135 A | 10/2017 |
| WO | 2021238434 A1 | 12/2021 |

* cited by examiner

PROFILING DEVICE, MANUFACTURING METHOD OF DISPLAY PANEL, AND DISPLAY PANEL

FIELD OF INVENTION

The present disclosure relates to the field of display technologies, and more particularly, to a profiling device, a manufacturing method of a display panel, and the display panel.

BACKGROUND OF INVENTION

With continuous development of science technology, flexible displays become a new growth point for display industries in the future. In order to improve screen ratios, flexible characteristics of flexible display panels have been continuously developed and used, for example, attaching the flexible display panels to curved coverplates can realize front and side displays, and four-sided curved display panels with lift or under-screen cameras can visually achieve true full screens.

At present, in manufacturing processes of curved display panels, flexible panels are usually attached to carrier films, and then the four-sided curved display panels are formed by vacuum adsorption or mold pressing. However, there are many uncontrollable factors in these methods when shaping, which are easy to generate redundant parts at four corners of the flexible panels, the redundant parts will cause attachment wrinkles, and it is easy to damage the flexible panels during compression molding, thereby being difficult to realize a required fitting effect of four-sided curved surfaces.

Technical problem: an embodiment of the present disclosure provides a profiling device, a manufacturing method of a display panel, and the display panel, which can improve controllability of display panels when forming curved surfaces, thereby improving process yields of the display panels.

SUMMARY OF INVENTION

An embodiment of the present disclosure provides a profiling device, which includes:
  a framework; and
  a profiling component disposed in the framework and including a first surface, wherein, the first surface includes a first region and a second region surrounding the first region, and a thickness of the profiling component corresponding to the first region is different from a thickness of the profiling component corresponding to the second region;
  wherein, the profiling component includes a first state and a second state, and in the first state, the first surface is used to attach to a display component; and in the second state, a part of the first surface corresponding to the first region is higher than a part of the first surface corresponding to the second region, and the part of the first surface corresponding to the second region is arc-shaped to allow a position of the display component corresponding to the second region to form a curved structure.

In an embodiment of the present disclosure, the profiling component includes a plurality of thimbles distributed in the framework, each of the thimbles is movably disposed in the framework along a first direction, and the first direction is a direction of the profiling component pointing to the display component; and wherein, each of the thimbles includes a first end positioned on the first surface, the thimbles include first thimbles disposed in the first region and second thimbles disposed in the second region, and in the second state, first ends of the first thimbles are higher than first ends of the second thimbles.

In an embodiment of the present disclosure, in the first state, the first surface is plane, and the first ends of the first thimbles are flush with the first ends of the second thimbles.

In an embodiment of the present disclosure, a length of the first thimbles is greater than a length of the second thimbles.

In an embodiment of the present disclosure, each of the thimbles includes a support rod and an elastic element, and the elastic element is sleeved on the support rod and located at the first end.

In an embodiment of the present disclosure, the support rod includes a first segment and a second segment, the first segment is slidingly connected to the framework along the first direction, and the second segment is slidingly connected to the first segment along the first direction.

In an embodiment of the present disclosure, the first surface further includes a third region on one side of the second region away from the first region, and in the second state, the part of the first surface corresponding to the second region is higher than a part of the first surface corresponding to the third region.

In an embodiment of the present disclosure, a distribution density of the thimbles in the second region is greater than a distribution density of the thimbles in the first region and a distribution density of the thimbles in the third region.

In an embodiment of the present disclosure, each of the thimbles is detachably installed in the framework.

In an embodiment of the present disclosure, the profiling device further includes a driving component configured to connect the profiling component to drive the profiling component to switch between the first state and the second state.

In an embodiment of the present disclosure, the driving component includes a contact plate, the profiling component includes a second surface disposed opposite to the first surface, and the contact plate is used to abut the second surface.

Based on the above objectives of the present disclosure, a manufacturing method of a display panel is provided, which is manufactured using a profiling device, wherein, the profiling device includes:
  a framework; and
  a profiling component disposed in the framework and including a first surface, wherein, the first surface includes a first region and a second region surrounding the first region, and a thickness of the profiling component corresponding to the first region is different from a thickness of the profiling component corresponding to the second region;
  wherein, the profiling component includes a first state and a second state, and in the first state, the first surface is used to attach to a display component; and in the second state, a part of the first surface corresponding to the first region is higher than a part of the first surface corresponding to the second region, and the part of the first surface corresponding to the second region is arc-shaped to allow a position of the display component corresponding to the second region to form a curved structure; and the manufacturing method of the display panel includes following steps:
   providing the display component;
   controlling the profiling component to be in the first state, and attaching the display component to the first surface of the profiling component; and
   controlling the profiling component to be in the second state to allow the position of the display component corresponding to the second region to form the curved structure to form the display panel.

In an embodiment of the present disclosure, the display component includes a panel body and a flexible layer disposed in a stack, and the step of attaching the display component to the first surface of the profiling component includes a following step:
   attaching one side of the display component formed with the flexible layer to the first surface of the profiling component.

In an embodiment of the present disclosure, the step of controlling the profiling component to be in the second state to allow the position of the display component corresponding to the second region to form the curved structure to form the display panel includes following steps:
   providing a coverplate;
   keeping the profiling component to be in the second state, and attaching the coverplate to one side of the display component formed with the panel body;
   separating the coverplate and the display component from the profiling component; and
   separating the coverplate and the panel body from the flexible layer to form the display panel.

In an embodiment of the present disclosure, the profiling component includes a plurality of thimbles distributed in the framework, each of the thimbles is movably disposed in the framework along a first direction, and the first direction is a direction of the profiling component pointing to the display component; and
   wherein, each of the thimbles includes a first end positioned on the first surface, the thimbles include first thimbles disposed in the first region and second thimbles disposed in the second region, and in the second state, first ends of the first thimbles are higher than first ends of the second thimbles.

In an embodiment of the present disclosure, in the first state, the first surface is plane, and the first ends of the first thimbles are flush with the first ends of the second thimbles.

In an embodiment of the present disclosure, a length of the first thimbles is greater than a length of the second thimbles.

In an embodiment of the present disclosure, each of the thimbles includes a support rod and an elastic element, and the elastic element is sleeved on the support rod and located at the first end.

In an embodiment of the present disclosure, each of the thimbles is detachably installed in the framework.

Based on the above objectives of the present disclosure, a display panel is provided, which is manufactured by a manufacturing method of the display panel using a profiling device, wherein, the profiling device includes:
   a framework; and
   a profiling component disposed in the framework and including a first surface, wherein, the first surface includes a first region and a second region surrounding the first region, and a thickness of the profiling component corresponding to the first region is different from a thickness of the profiling component corresponding to the second region;
   wherein, the profiling component includes a first state and a second state, and in the first state, the first surface is used to attach to a display component; and in the second state, a part of the first surface corresponding to the first region is higher than a part of the first surface corresponding to the second region, and the part of the first surface corresponding to the second region is arc-shaped to allow a position of the display component corresponding to the second region to form a curved structure; and
   the manufacturing method of the display panel includes following steps:
   providing the display component;
   controlling the profiling component to be in the first state, and attaching the display component to the first surface of the profiling component; and
   controlling the profiling component to be in the second state to allow the position of the display component corresponding to the second region to form the curved structure to form the display panel.

Beneficial effect: compared to current technology, the present disclosure disposes the profiling component having switchable states, attaches the display component to the first surface of the profiling component, and adjusts a concavo-convex state of the first surface by controlling a state of the profiling component. Since the display component fits the first surface, during a process of switching the state of the profiling component, a shape of the display component will also change with the concavo-convex state of the first surface, thereby allowing the display component to form the curved structure. The present disclosure can control a process of the display component forming the curved structure in real time by controlling the process of switching the state of the profiling component. A state change of the curved structure is synchronized with a state change of the first surface, which can improve controllability of the display panel when forming curved surfaces, thereby preventing the display panel from generating wrinkles when forming the curved surfaces, thereby improving process yields of curved display panels.

DESCRIPTION OF DRAWINGS

The following detailed description of specific embodiments of the present disclosure will make the technical solutions and other beneficial effects of the present disclosure obvious with reference to the accompanying drawings.

DETAILED DESCRIPTION OF PREFERRED EMBODIMENTS

Figure 1A:
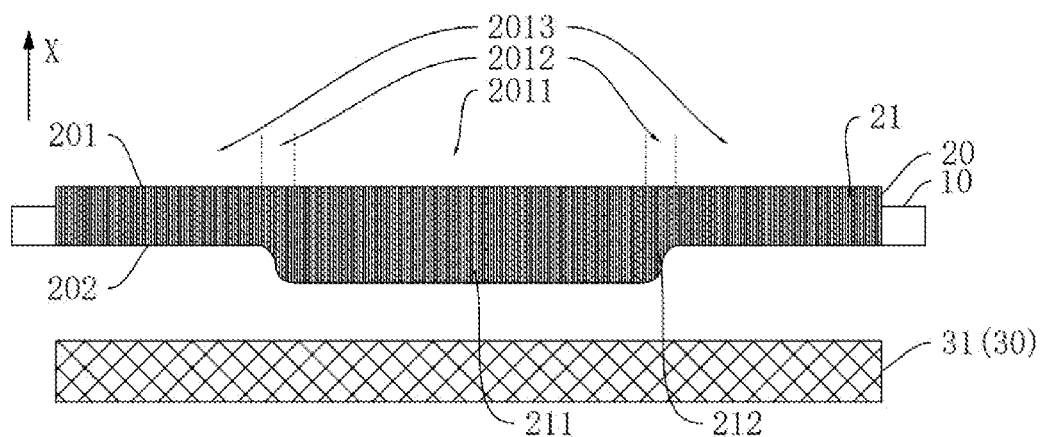
FIG. 1A is a schematic structural diagram of a first state of a profiling device according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

The following description provides many different embodiments or examples for implementing different structures of the present disclosure. In order to simplify the present disclosure, the components and settings of a specific example are described below. Of course, they are merely examples and are not intended to limit the present disclosure. In addition, the present disclosure may repeat reference numerals and/or reference letters in different examples, which are for the purpose of simplicity and clarity, and do not indicate the relationship between the various embodiments and/or arrangements discussed. In addition, the present disclosure provides examples of various specific processes and materials, but one of ordinary skill in the art will recognize the use of other processes and/or the use of other materials.

Figure 1B:
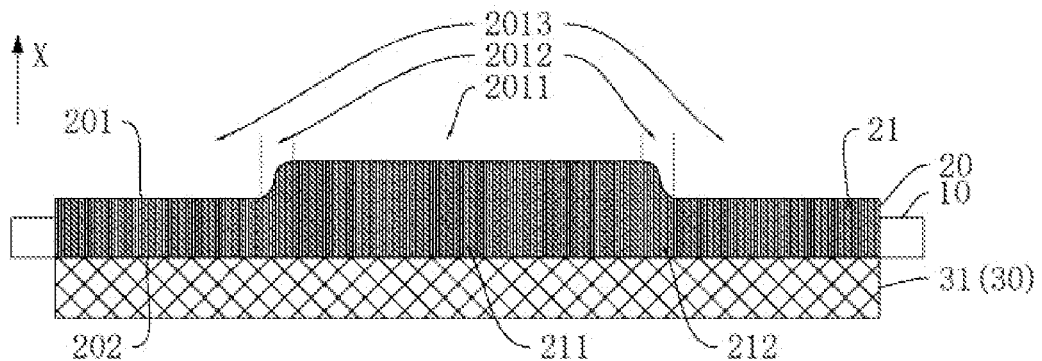
FIG. 1B is a schematic structural diagram of a second state of the profiling device according to an embodiment of the present disclosure.

An embodiment of the present disclosure provides a profiling device, referring to FIGS. 1A and 1B, the profiling device includes a framework 10 and a profiling component 20.

Wherein, the profiling component 20 is disposed in the framework 10 and includes a first surface 201. Further, the first surface 201 includes a first region 2011 and a second region 2012 surrounding the first region 2011, and a thickness of the profiling component 20 corresponding to the first region 2011 is different from a thickness of the profiling component 20 corresponding to the second region 2012.

In addition, the profiling component 20 includes a first state (as shown in FIG. 1A) and a second state (as shown in FIG. 1B), and in the first state, the first surface 201 is used to attach to a display component. In the second state, a part of the first surface 201 corresponding to the first region 2011 is higher than a part of the first surface 201 corresponding to the second region 2012, and the part of the first surface 201 corresponding to the second region 2012 is arc-shaped to allow a position of the display component corresponding to the second region 2012 to form a curved structure, thereby forming a curved display panel.

In the process of implementing the present disclosure, the embodiment of the present disclosure disposes the profiling component 20 having switchable states, attaches the display component to the first surface 201 of the profiling component 20, and adjusts a concavo-convex state of the first surface 201 by controlling a state of the profiling component 20. Since the display component fits the first surface 201, during a process of switching the state of the profiling component 20, a shape of the display component will also change with the concavo-convex state of the first surface 201, thereby allowing the display component to form the curved structure. The present disclosure can control a process of the display component forming the curved structure in real time by controlling the process of switching the state of the profiling component 20. A state change of the curved structure is synchronized with a state change of the first surface 201, which can improve controllability of the display component when forming curved surfaces, thereby preventing a formed curved display panel from generating wrinkles on the curved structure, thereby improving process yields of curved display panels.

Specifically, in an embodiment of the present disclosure, combining FIGS. 1A, 1B, 2A, 2B, 20, 2D, 3A, and 3B, the profiling device provided in the embodiment of the present disclosure includes the framework 10 and the profiling component 20 disposed in the framework 10, the profiling component 20 includes the first surface 201 and a second surface 202 disposed opposite to the first surface 201, and concavo-convex states of the first surface 201 and the second surface 202 change with state switching of the profiling component 20.

It should be noted that in the embodiment of the present disclosure, the first surface 201 includes the first region 2011, the second region 2012 surrounding the first region 2011, and a third region 2013 located on one side of the second region 2012 away from the first region 2011, and a change of the concavo-convex state of the first surface 201 means that a surface morphology of the first region 2011, the second region 2012, and the third region 2013 changes with switching of the state of the profiling component 20.

Figure 2A:
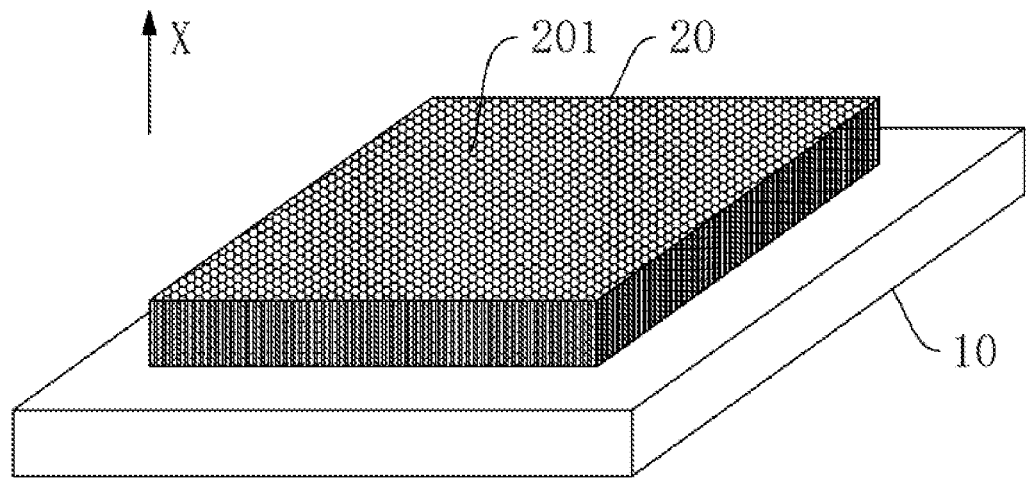
FIG. 2A is a schematic structural diagram of a first surface of the profiling device in the first state according to an embodiment of the present disclosure.
Figure 2B:
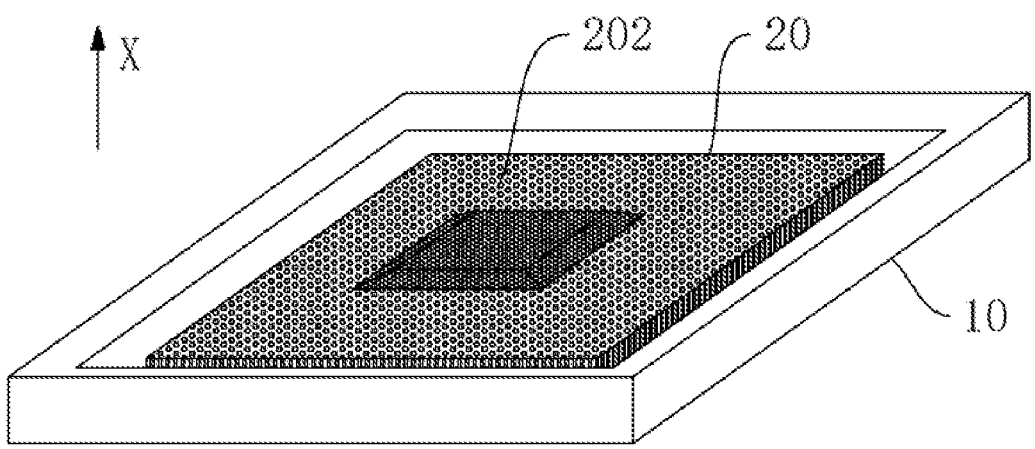
FIG. 2B is a schematic structural diagram of a second surface of the profiling device in the first state according to an embodiment of the present disclosure.

Further, when the profiling component 20 is in the first state (as shown in FIGS. 1A, 2A, and 2B), the first surface 201 is plane, a part of the second surface 202 corresponding to the first region 2011 and a part of the second surface 202 corresponding to the second region 2012 both protrude outward, and a protruding degree of the part of the second surface 202 corresponding to the first region 2011 is greater than a protruding degree of the part of the second surface 202 corresponding to the second region 2012. In addition, the part of the second surface 202 corresponding to the second region 2012 is arc-shaped.

Figure 2C:
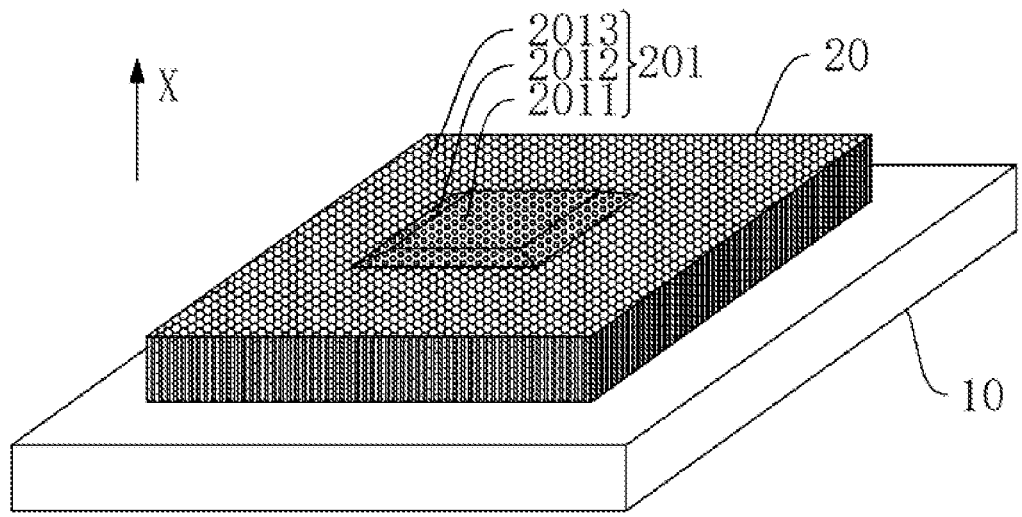
FIG. 2C is a schematic structural diagram of the first surface of the profiling device in the second state according to an embodiment of the present disclosure.
Figure 2D:
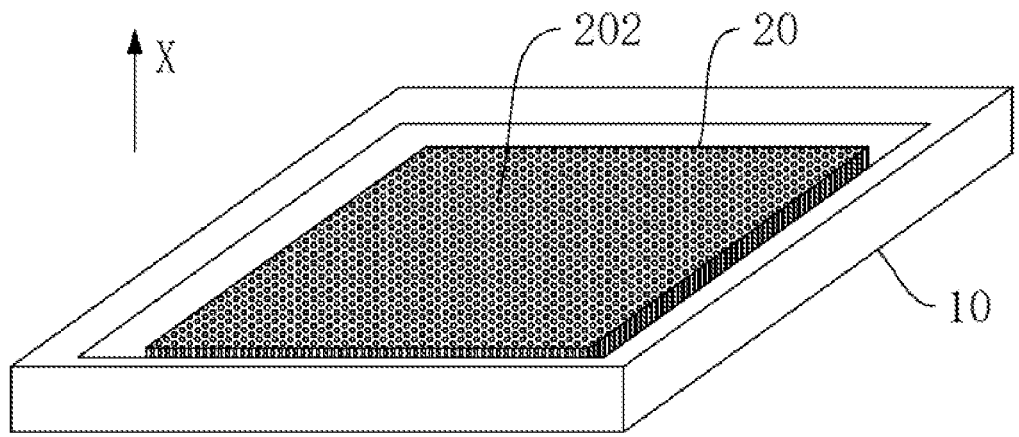
FIG. 2D is a schematic structural diagram of the second surface of the profiling device in the second state according to an embodiment of the present disclosure.

When the profiling component 20 is in the second state (as shown in FIGS. 1B, 2C, and 2D), the second surface 202 is plane, a part of the first surface 201 corresponding to the first region 2011 is higher than a part of the first surface 201 corresponding to the second region 2012, and the part of the first surface 201 corresponding to the second region 2012 is higher than a part of the first surface 201 corresponding to the third region 2013. In addition, the part of the first surface 201 corresponding to the second region 2012 is arc-shaped.

Therefore, when the display component is attached to the first surface 201, with switching of the state of the profiling component 20 and changing of the state of the first surface 201, the state of the display component will also change, and the arc-shaped part which corresponds to the second region 2012 will form the curved structure.

Further, in the embodiment of the present disclosure, the profiling component 20 includes a plurality of thimbles 21 distributed in the framework 10, a first direction X is defined as a direction of the profiling component 20 pointing to the display component, and each of the thimbles 21 is movably disposed in the framework 10 along the first direction X. Each of the thimbles 21 includes a first end in the first surface 201 and a second end in the second surface 202, thereby changing an arrangement state of first ends of the thimbles 21, for example, aligned or not aligned, by controlling a moving process of the thimbles 21 along the first direction X. Therefore, the concavo-convex state of the first surface 201 will change to allow the profiling component 20 to switch between the first state and the second state.

Specifically, the thimbles 21 include a plurality of first thimbles 211 in the first region 2011 and a plurality of second thimbles 212 in the second region 2012. When the profiling component 20 is in the first state, the first surface 201 is plane, and first ends of the first thimbles 211 are flush with first ends of the second thimbles 212. When the profiling component 20 is in the second state, the part of the first surface 201 corresponding to the first region 2011 is higher than the part of the first surface 201 corresponding to the second region 2012, so the first ends of the first thimbles 211 are higher than the first ends of the second thimbles 212. Further, heights of the first ends of the second thimbles 212 decrease in a direction away from the first region 2011 to allow the part of the first surface 201 corresponding to the second region 2012 to be arc-shaped.

Optionally, each of the thimbles 21 is detachably installed in the framework 10, so when another display panel having a different curvature of curved surfaces is needed, only a part of the thimbles 21 is needed to be replaced, thereby saving process steps and reducing process costs. In addition, when the thimbles 21 are damaged, it can continue to work by replacing the damaged thimbles 21 rather than replacing entire profiling component 20, which can reduce the process costs.

In this embodiment, a length of the first thimbles 211 is greater than a length of the second thimbles 212, and this embodiment and subsequent embodiments are described in this example.

It should be noted that a relationship between the lengths of the first thimbles 211 and the second thimbles 212 is not limited to this, and it may also be that the length of the second thimbles 212 being greater than the length of the first thimbles 211 to allow a thickness of the profiling component 20 corresponding to the first region 2011 to be different from a thickness of the profiling component 20 corresponding to the second region 2012.

Figure 3A:
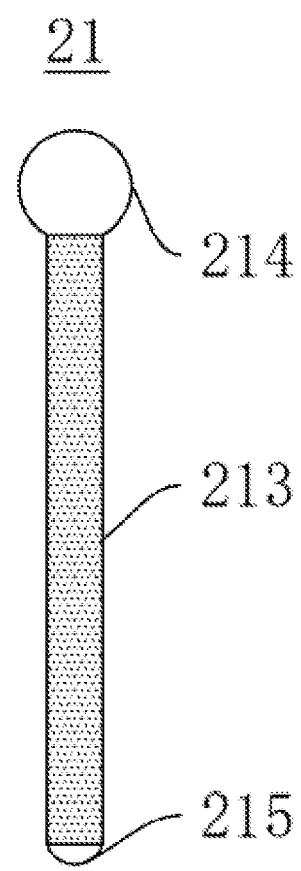
FIG. 3A is a schematic structural diagram of a thimble according to an embodiment of the present disclosure.

In addition, referring to FIG. 3A, each of the thimbles 21 includes a support rod 213, an elastic element 214 sleeved on one end of the support rod 213, and an abutment element 215 disposed on an opposite end of the support rod 213. Wherein, the elastic element 214 is located at a first end of the thimbles 21, and the abutment element 215 is located at a second end of the thimbles 21.

Optionally, a material of the elastic element 214 may be flexible silicone materials or rubber materials, and a material of the abutment element 215 may be teflon materials. Therefore, when the first end of the thimbles 21 is in contact with the display component, the elastic element 214 can play a role in buffering stresses to effectively prevent the display component from being damaged during the manufacturing process.

In this embodiment, a spacing between adjacent thimbles 21 may be less than or equal to 1 mm, and a diameter of the elastic element 214 may be less than or equal to 0.5 mm.

Figure 3B:
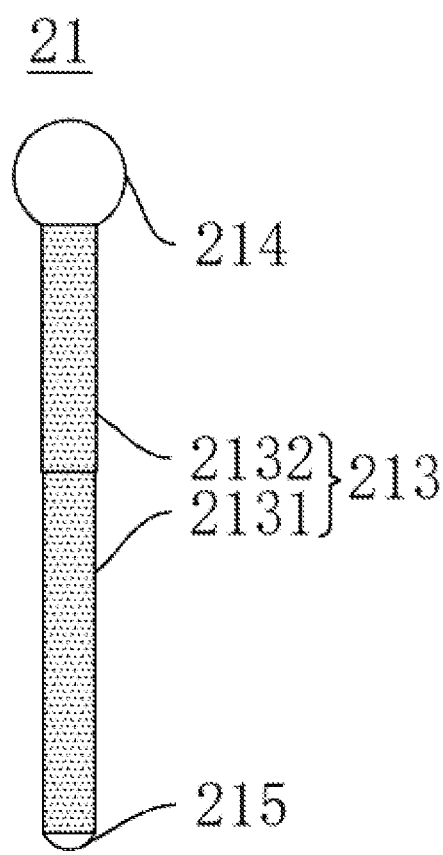
FIG. 3B is another schematic structural diagram of the thimble according to an embodiment of the present disclosure.

Referring to FIGS. 1A and 3B, in other embodiments of the present disclosure, the support rod 213 includes a first segment 2131 and a second segment 2132, which are slidingly connected along the first direction X, and the first segment 2131 is slidingly connected to the framework 10 along the first direction X. Optionally, the first segment 2131 and the second segment 2132 may slidingly connected to each other by a nested way, and there is damping between the first segment 2131 and the second segment 2132. Therefore, when the thimbles 21 move in the first direction X and the part of the display component is lifted to form the curved structure, a certain degree of sliding can occur between the first segment 2131 and the second segment 2132 to make a certain change in the lengths of the thimbles 21. Therefore, fine changes of the lengths of the thimbles 21 during movement can be adjusted by controlling the damping of the thimbles 21, thereby realizing fine control of deformation of the display component.

Optionally, when sliding occurs between the first segment 2131 and the second segment 2132, that is, when the length of the thimbles 21 becomes short, the length cannot be recovered automatically, and it needs to be passively recovered before next operation.

In the embodiment of the present disclosure, each part of the display component is lifted by disposing the thimbles 21, thereby allowing the shape of the display component to change. That is, the embodiment realizes point-to-point stretching of the curved surfaces of the display component by point-to-point control of the thimbles 21, thereby realizing the fine control of the display component forming the curved structure.

Optionally, a distribution density of the thimbles 21 in the second region 2012 is greater than a distribution density of the thimbles 21 in the first region 2011, and the distribution density of the thimbles 21 in the second region 2012 is also greater than a distribution density of the thimbles 21 in the third region 2013. Since the part of the display component corresponding to the second region 2012 is a part to form the curved structure, by defining the distribution density of the thimbles 21 in the second region 2012 to be the largest, the embodiment can improve point-to-point stretching performance of the profiling component 20 corresponding to the second region 2012, thereby improving yields and reliability of the display component forming the curved structure.

Wherein, in the second region 2012, in areas where a curvature of the curved surfaces changes more, the distribution density of the thimbles 21 in the areas is larger. For example, a distribution density of the thimbles 21 in a corner area is greater than a distribution density of the thimbles 21 in other areas. Since curved surfaces that the display component needs to form in the corner area are more complicated and have more curvature changes than in other areas, the embodiment increases the distribution density of the thimbles 21 in the corner area of the second region 2012, which can further improve the fine control of the corner area of the profiling component 20 corresponding to the second region 2012, thereby improving yields and reliability of the display component forming the curved structure.

Further, the profiling device further includes a driving component 30 configured to connect the profiling component 20 to allow the profiling component 20 to switch between the first state and the second state.

In this embodiment, the driving component 30 includes a contact plate 31, and the contact plate 31 is used to abut the second end of the thimbles 21. That is, the contact plate 31 is used to abut the second surface 202 of the profiling component 20 to allow the thimbles 21 to move in the first direction X.

Specifically, combining FIGS. 1A and 1B, in the first state, the first surface 201 is plane, the parts of the second surface 202 corresponding to the first region 2011 and the second region 2012 protrude outward, that is, the length of the first thimbles 211 in the first region 2011 is greater than the length of the second thimbles 212 in the second region 2012. At this time, the contact plate 31 and the profiling component 20 are separated.

In a process of the profiling component 20 switches from the first state to the second state, the contact plate 31 is in contact with the second surface 202 of the profiling component 20, abuts the first thimbles 211 which have a longer length first, and continues to lift in the first direction X to allow the first thimbles 211 to move in the first direction X. Then the contact plate 31 is in contact with the second thimbles 212 which have a shorter length, and continues to lift in the first direction X to allow the second thimbles 212 to move in the first direction X. Therefore, second ends of the thimbles 21 are flush with each other, that is, the second surface 202 of the profiling component 20 is allowed to be plane. It can be understood that the plurality of the thimbles 21 all move in the first direction X, so the first ends of the thimbles 21 lift corresponding parts of the display component. Since the lengths of the first thimbles 211 and the second thimbles 212 are different and the heights of the first ends of the second thimbles 212 decrease in the direction away from the first region 2011 in the second state, the part of the first surface 201 corresponding to the second region 2012 is arc-shaped, thereby the part of the display component corresponding to the second region 2012 being able to form the curved structure.

Figure 4A:
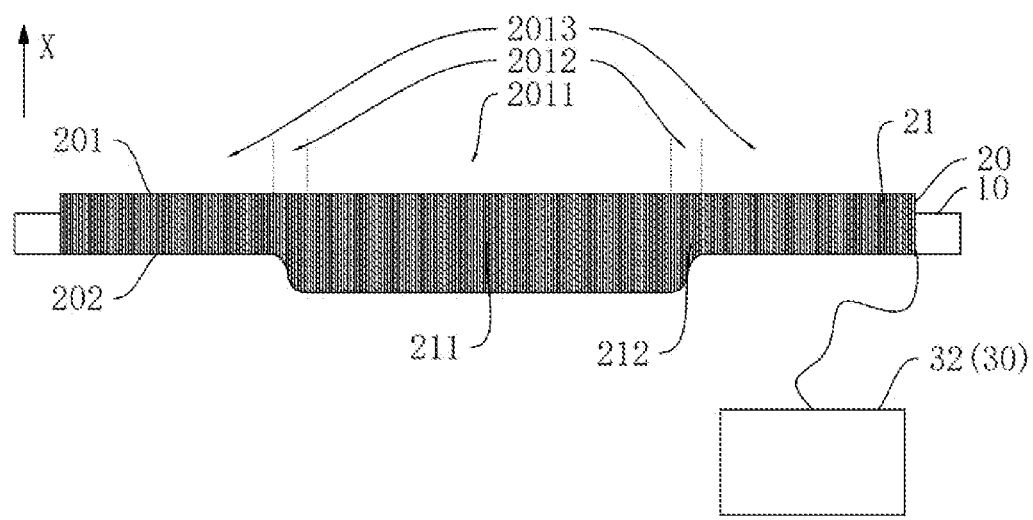
FIG. 4A is another schematic structural diagram of the first state of the profiling device according to an embodiment of the present disclosure.
Figure 4B:
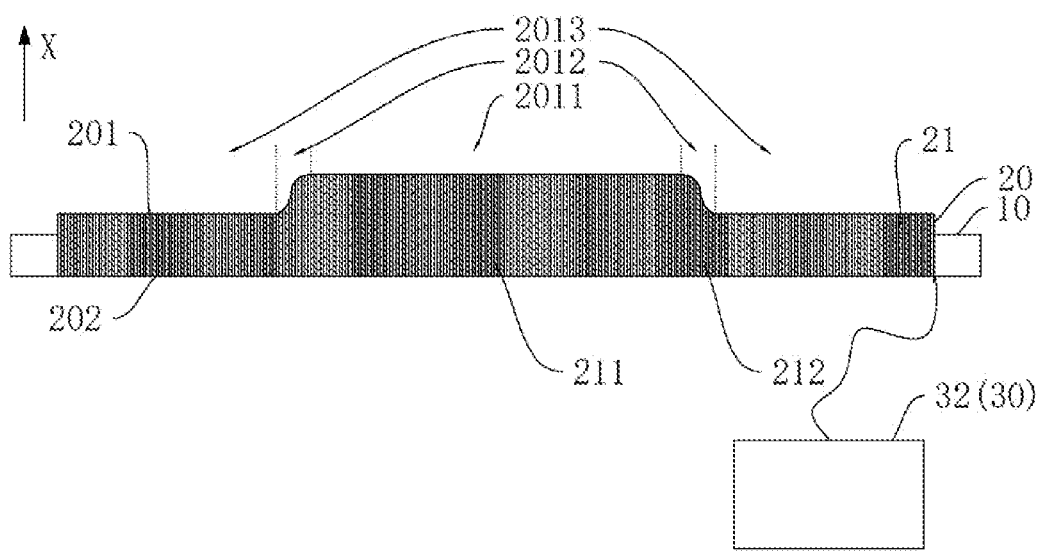
FIG. 4B is another schematic structural diagram of the second state of the profiling device according to an embodiment of the present disclosure.

In another embodiment of the present disclosure, referring to FIGS. 4A and 4B, a difference between this embodiment and the previous embodiment is that in this embodiment, the driving component 30 is a logic control system 32, and the logic control system 32 includes a control unit and a driving unit electrically connected to the control unit. Each of the thimbles 21 can move in the first direction X by setting up a program in the control unit and driving each thimble 21 by connecting the driving unit. Different programs may be set up according to the curvature of the curved surfaces of the display panel that is needed to allow each thimble 21 has different ways of moving, thereby obtaining the curved display panel that is required.

Therefore, the embodiment of the present disclosure disposes the profiling component 20 having switchable states, attaches the display component to the first surface 201 of the profiling component 20, and adjusts the concavo-convex state of the first surface 201 by controlling the state of the profiling component 20. Since the display component fits the first surface 201, during the process of switching the state of the profiling component 20, the shape of the display component will also change with the concavo-convex state of the first surface 201, thereby allowing the display component to form the curved structure. The present disclosure can control the process of the display component forming the curved structure in real time by controlling the process of switching the state of the profiling component 20, and the state change of the curved structure is synchronized with the state change of the first surface 201. Further, the embodiment of the present disclosure can realize point-to-point stretching of the display component by disposing the plurality of the thimbles 21 and changing the shape of different parts of the display component by lifting the thimbles 21, which can improve controllability of the display panel when forming the curved surfaces, thereby preventing the display panel from generating wrinkles when forming the curved surfaces, thereby improving process yields of the curved display panels.

Figure 5:
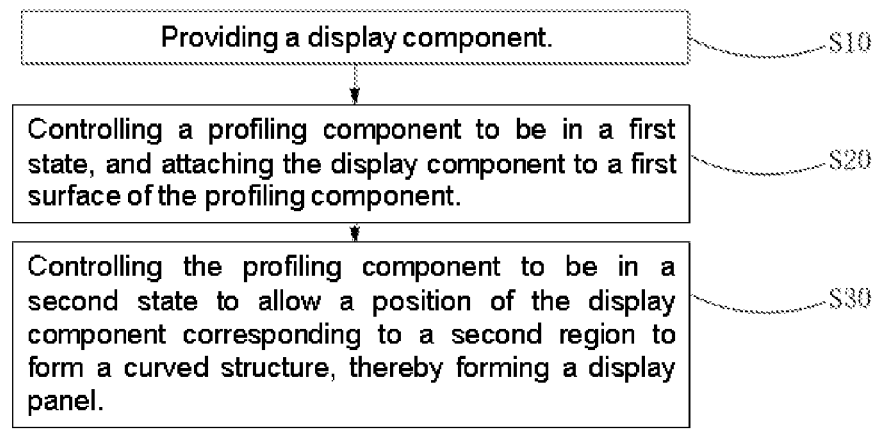
FIG. 5 is a flowchart of a manufacturing method of a display panel according to an embodiment of the present disclosure.
Figure 6A:
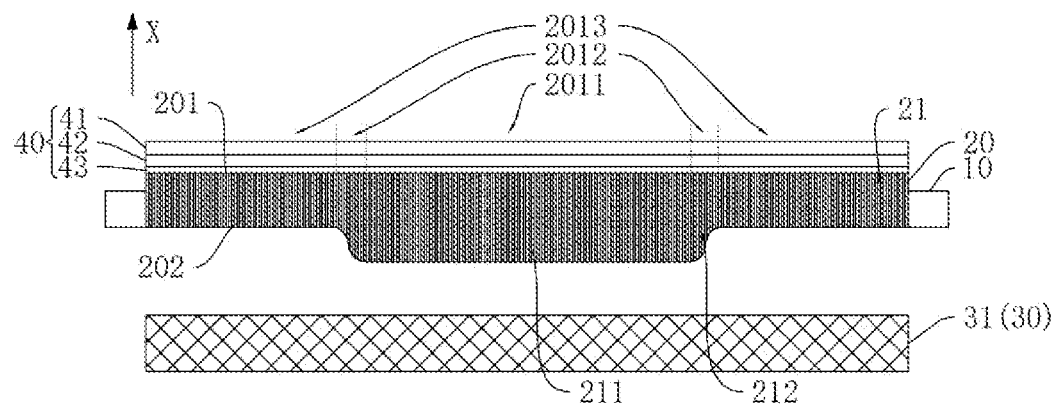
FIG. 6A is a schematic structural diagram of a working process of the profiling device in the first state according to an embodiment of the present disclosure.
Figure 6B:
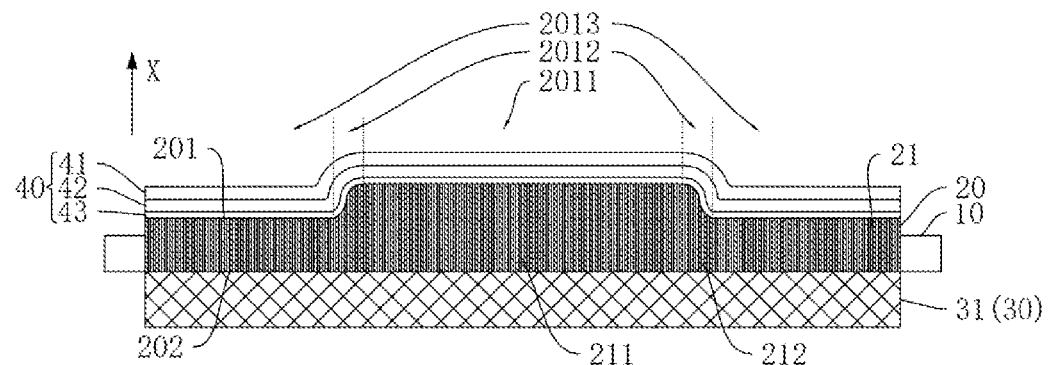
FIG. 6B is a schematic structural diagram of the working process of the profiling device in the second state according to an embodiment of the present disclosure.

In addition, referring to FIGS. 5, 6A, and 6B, an embodiment of the present disclosure further provides a manufacturing method of a display panel, which uses the profiling component 20 in the embodiments mentioned above. In this embodiment, the profiling component 20 mentioned in the first embodiment is taken as an example for description.

The manufacturing method of the display panel includes following steps.

S10: providing the display component 40.

A flexible layer 42 is disposed on one side of a panel body 41, and a material of the flexible layer 42 includes rubber materials or polydimethylsiloxane (PDMS) materials.

Optionally, the panel body 41 may be an OLED display device or a micro-LED display device.

S20: controlling the profiling component 20 to be in the first state and attaching the display component 40 to the first surface 201 of the profiling component 20.

The contact plate 31 is controlled to be separated from the profiling component 20, the part of the second surface 202 corresponding to the first region 2011 and the part of the second surface 202 corresponding to the second region 2012 both protrude outward, and the protruding degree of the part of the second surface 202 corresponding to the first region 2011 is greater than the protruding degree of the part of the second surface 202 corresponding to the second region 2012. In addition, the part of the second surface 202 corresponding to the second region 2012 is arc-shaped to allow the profiling component 20 to be in the first state, that is, allowing the first surface 201 to be plane.

One side of the panel body 41 formed with the flexible layer 42 is attached to the first surface 201 by an optical adhesive layer 43 (OCA).

Since the first surface 201 is plane in the first state, a bonding yield between the display component 40 and the first surface 201 can be improved.

S30: controlling the profiling component 20 to be in the second state to allow the position of the display component 40 corresponding to the second region 2012 to form the curved structure, thereby forming the display panel.

Controlling the contact plate 31 to be in contact with the second surface 202 and keeping the contact plate 31 to be in a lift state until the second surface 202 is plane can allow the part of the first surface 201 corresponding to the first region 2011 to be higher than the part of the first surface 201 corresponding to the second region 2012, and can make the part of the first surface 201 corresponding to the second region 2012 be arc-shaped, that is, allowing the profiling component 20 to switch to the second state.

In the process, the contact plate 31 abuts the first thimbles 211 which have the longer length first, then makes the first thimbles 211 move in the first direction X to abut the second thimbles 212 which have the shorter length, and then makes the second thimbles 212 move in the first direction X to allow the second surface 202 to be plane. Since the lengths of the first thimbles 211 are greater than the lengths of the second thimbles 212, a distance that the first ends of the first thimbles 211 rises along the first direction X is greater than a distance that the first ends of the second thimbles 212 rises along the first direction X. Therefore, in the movement process of the thimbles 21 in the first direction X, a part of the display component 40 corresponding to the first region 2011 will protrude first, and then the part of the display component 40 corresponding to the second region 2012 will also protrude upward. The protruding degree of the part of the display component 40 corresponding to the second region 2012 is less than the part of the display component 40 corresponding to the first region 2011. At a same time, since the part of the first surface 201 corresponding to the second region 2012 is arc-shaped, the part of the display component 40 corresponding to the second region 2012, which is attached to the first surface 201, will also form the curved structure under lifting effects.

Next, providing a coverplate, keeping the profiling component 20 to be in the second state, and attaching the coverplate to one side of the display component 40 provided with the panel body 41, that is, attaching the coverplate to the panel body 41.

Then separating the coverplate and the display component 40 from the profiling component 20 to obtain a stacked structure of the coverplate and the display component 40.

At last, separating the coverplate and the panel body 41 from the flexible layer 42 to obtain a stacked structure of the coverplate and the panel body 41, thereby obtaining the display panel, that is, the curved display panel.

In addition, an embodiment of the present disclosure further provides the display panel and a display device. The display panel is the curved display panel manufactured by the manufacturing method of the display panel described in the above embodiment.

The display device includes the display panel and a device body, and the display panel and the device body are combined into one integrated structure.

In summary, the embodiment of the present disclosure disposes the profiling component 20 having switchable states, attaches the display component 40 to the first surface 201 of the profiling component 20, and adjusts the concavo-convex state of the first surface 201 by controlling the state of the profiling component 20. Since the display component 40 fits the first surface 201, during the process of switching the state of the profiling component 20, the shape of the display component 40 will also change with the concavo-convex state of the first surface 201, thereby allowing the display component 40 to form the curved structure. The present disclosure can control the process of the display component 40 forming the curved structure in real time by controlling the process of switching the state of the profiling component 20, and the state change of the curved structure is synchronized with the state change of the first surface 201. Further, the embodiment of the present disclosure can realize point-to-point stretching of the display component 40 by disposing the plurality of the thimbles 21 and changing the shape of different parts of the display component 40 by lifting the thimbles 21, which can improve controllability of the display panel when forming the curved surfaces, thereby preventing the display panel from generating wrinkles when forming the curved surfaces, thereby improving process yields of the curved display panels.

In the above embodiments, the description of each embodiment has its own emphasis. For the parts that are not described in detail in an embodiment, can refer to the detailed description of other embodiments above.

The profiling device, the manufacturing method of a display panel, and the display panel provided by the embodiments of the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A profiling device, comprising:
   a framework; and
   a profiling component disposed in the framework and comprising a first surface, wherein the first surface comprises a first region and a second region surrounding the first region, and a thickness of the profiling component corresponding to the first region is different from a thickness of the profiling component corresponding to the second region;
   wherein the profiling component comprises a first state and a second state, and in the first state, the first surface is used to attach to a display component; and in the second state, a part of the first surface corresponding to the first region is higher than a part of the first surface corresponding to the second region, and the part of the first surface corresponding to the second region is arc-shaped to allow a position of the display component corresponding to the second region to form a curved structure;
   wherein the profiling component comprises a plurality of thimbles distributed in the framework, and each of the thimbles is movably disposed in the framework along a first direction from the profiling component to the display component and has a first end positioned on the first surface; and
   wherein each of the thimbles comprises a support rod, and an elastic element sleeved on the support rod and located at the first end, and the support rod comprises a first segment slidably connected to the framework along the first direction and a second segment slidably connected to the first segment along the first direction to enable a change in a length of each of the thimbles.

2. The profiling device according to claim 1, wherein the thimbles comprise first thimbles disposed in the first region and second thimbles disposed in the second region, and in the second state, first ends of the first thimbles are higher than first ends of the second thimbles.

3. The profiling device according to claim 2, wherein in the first state, the first surface is plane, and the first ends of the first thimbles are flush with the first ends of the second thimbles.

4. The profiling device according to claim 2, wherein a length of the first thimbles is greater than a length of the second thimbles.

5. The profiling device according to claim 2, wherein the first surface further comprises a third region on one side of the second region away from the first region, and in the second state, the part of the first surface corresponding to the second region is higher than a part of the first surface corresponding to the third region.

6. The profiling device according to claim 5, wherein a distribution density of the thimbles in the second region is greater than a distribution density of the thimbles in the first region and a distribution density of the thimbles in the third region.

7. The profiling device according to claim 2, wherein each of the thimbles is detachably installed in the framework.

8. The profiling device according to claim 1, further comprising a driving component configured to connect the profiling component to drive the profiling component to switch between the first state and the second state.

9. The profiling device according to claim 8, wherein the driving component comprises a contact plate, the profiling component comprises a second surface disposed opposite to the first surface, and the contact plate is used to abut the second surface.

10. A method of manufacturing a display panel using a profiling device, wherein the profiling device comprises:

a framework; and a profiling component disposed in the framework and comprising a first surface, wherein the first surface comprises a first region and a second region surrounding the first region, and a thickness of the profiling component corresponding to the first region is different from a thickness of the profiling component corresponding to the second region;

wherein the profiling component comprises a first state and a second state, and in the first state, the first surface is used to attach to a display component; and in the second state, a part of the first surface corresponding to the first region is higher than a part of the first surface corresponding to the second region, and the part of the first surface corresponding to the second region is arc-shaped to allow a position of the display component corresponding to the second region to form a curved structure;

wherein the profiling component comprises a plurality of thimbles distributed in the framework, and each of the thimbles is movably disposed in the framework along a first direction from the profiling component to the display component and has a first end positioned on the first surface; and wherein each of the thimbles comprises a support rod, and an elastic element sleeved on the support rod and located at the first end, and the support rod comprises a first segment slidably connected to the framework along the first direction and a second segment slidably connected to the first segment along the first direction to enable a change in a length of each of the thimbles; and wherein the manufacturing method of the display panel comprises following steps:

providing the display component;

controlling the profiling component to be in the first state, and attaching the display component to the first surface of the profiling component; and controlling the profiling component to be in the second state to allow the position of the display component corresponding to the second region to form the curved structure to form the display panel.

11. The manufacturing method of the display panel according to claim 10, wherein the display component comprises a panel body and a flexible layer disposed in a stack, and the attaching of the display component to the first surface of the profiling component comprises attaching a side of the display component on which the flexible layer is formed to the first surface of the profiling component.

12. The method according to claim 11, wherein the controlling of the profiling component to be in the second state to allow the position of the display component corresponding to the second region to form the curved structure to form the display panel comprises:

providing a coverplate;

keeping the profiling component to be in the second state, and attaching the coverplate to a side of the display component on which the panel body is formed;

separating the coverplate and the display component from the profiling component; and separating the coverplate and the panel body from the flexible layer to form the display panel.

13. The method according to claim 10, wherein the thimbles comprise first thimbles disposed in the first region and second thimbles disposed in the second region, and in the second state, first ends of the first thimbles are higher than first ends of the second thimbles.

14. The method according to claim 13, wherein in the first state, the first surface is plane, and the first ends of the first thimbles are flush with the first ends of the second thimbles.

15. The method according to claim 13, wherein a length of the first thimbles is greater than a length of the second thimbles.

16. The method according to claim 13, wherein each of the thimbles is detachably installed in the framework.

\* \* \* \* \*